United States Patent [19]
Albrecht et al.

[11] Patent Number: 5,715,591
[45] Date of Patent: Feb. 10, 1998

[54] PROCESS AND DESIGN FOR PRODUCING INSIDE COILS

[75] Inventors: Friedrich Albrecht, Fürth; Otto Weiss, Spalt, both of Germany

[73] Assignee: Grundig AG, Fuerth, Germany

[21] Appl. No.: 605,078

[22] PCT Filed: Sep. 14, 1994

[86] PCT No.: PCT/EP94/03074

§ 371 Date: Mar. 4, 1996

§ 102(e) Date: Mar. 4, 1996

[87] PCT Pub. No.: WO95/08178

PCT Pub. Date: Mar. 23, 1995

[30] Foreign Application Priority Data

Sep. 17, 1993 [DE] Germany ............ 43 31 621.2

[51] Int. Cl.⁶ ............................................. H01F 41/06
[52] U.S. Cl. ............................ 29/605; 29/596; 29/598
[58] Field of Search ...................... 29/418, 596, 598, 29/602.1, 605, 606

[56] References Cited

U.S. PATENT DOCUMENTS

| | | | |
|---|---|---|---|
| 4,023,262 | 5/1977 | Miknaitis | 29/605 |
| 4,882,833 | 11/1989 | Hiramatsu et al. | 29/596 |

FOREIGN PATENT DOCUMENTS

| | | | |
|---|---|---|---|
| 1051643 | 4/1979 | Canada | 29/605 |
| 0257330 | 3/1988 | European Pat. Off. | |
| 3810037 | 10/1989 | Germany | |
| 3831721 | 3/1990 | Germany | |
| 4300756 | 12/1993 | Germany | |
| 244007 | 10/1986 | Japan | 29/605 |
| 62279610 | 10/1987 | Japan | |
| 63220507 | 9/1988 | Japan | |
| 4340210 | 11/1992 | Japan | |

*Primary Examiner*—W. Donald Bray
*Attorney, Agent, or Firm*—Paul J. Vincent

[57] ABSTRACT

It is well known that induction regulators are used in transmitting signals in head drum structures in video devices or equipment for digital recording and playback of signals. Since each head on the head wheel requires its own induction regulator, or transformer for short, there can be a relatively large number of transformers. This plus the fact that head drum units are becoming increasing smaller, and transmission frequencies increasingly higher, leads to very high demands for precision on the part of the transformer. This applies both to the ferrite rings and to the coils of the transformer. A device is proposed with which coils can be produced with high precision in the inner groove of the ferrite ring.

13 Claims, 2 Drawing Sheets

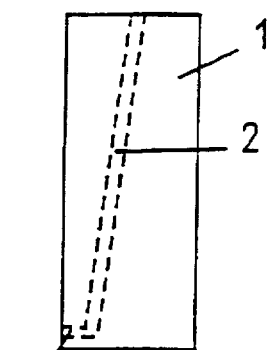
Fig.1A
Fig.1B
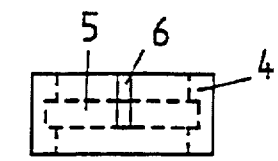
Fig.1C
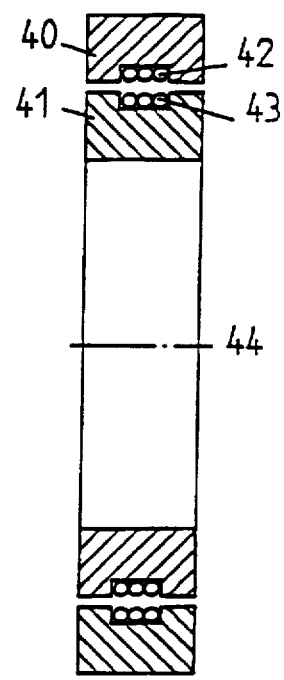
Fig.4
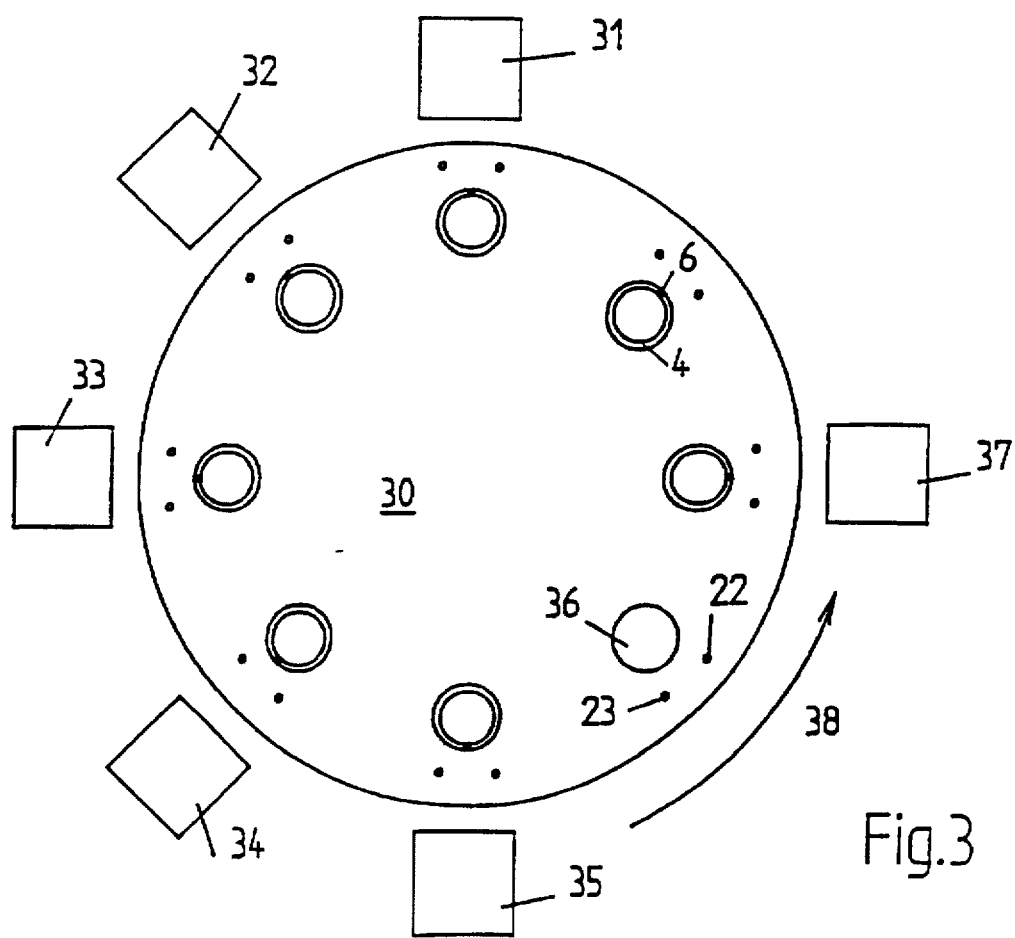
Fig.3 ial exit opening connecting with the bore through which the winding wire is guided; a second cylindrical body is provided for; the winding spindle and second cylindrical body have the same outer diameter which is slightly smaller than the inner diameter of the ring-shaped body; the winding spindle and the second cylindrical body are introduced into the ring-shaped body from opposite sides; the inner winding is produced by rotation and axial motion of the winding spindle and the second cylindrical body or, optionally, of the ring-shaped body; and the winding spindle is removed from the ring-shaped body after completion of the inner winding with the second cylindrical body remaining in ring-shaped body until the inner winding is secured in ring-shaped body.
PROCESS AND DESIGN FOR PRODUCING INSIDE COILS

BACKGROUND OF THE INVENTION

The invention concerns a method and a configuration for the production of inside coils with a single layer inner winding in an inner groove of a ring-shaped body having a groove for the input and output of a winding wire.

The utilization of rotating head wheels having one or more heads in video recorders or recorders for digital recording and playback of signals to or from a magnetic tape is known in the art. The signals are recorded onto the magnetic band in diagonal tracks. Conventional induction regulators are utilized in order to facilitate transfer of the signals between a head wheel and the stationary part of a head drum. These induction regulators are usually constructed in a manner corresponding to the representation of FIG. 4. The induction regulators comprise a stationary part 40 which is associated with the stationary head drum, and a component 41 associated and rotating with the head wheel about the axis 44. Each component is provided with a winding 42, 43. A head drum configuration must have as many transformers as there are heads on the head wheel.

The use of such transformers is, for example, known in the art from DE 38 10 037 A1. The transformers utilized therein comprise inner and outer ferrite cores, each having a winding. Signal transfer takes place radially between a ferrite ring or rings in the outer stationary part and a ferrite ring or rings located in the inner rotating part.

The volume of the transformers necessarily decreases with the miniaturization of head drum units as well as with the increase in the frequencies to be transferred and/or with increasing numbers of transformers, as is in particular the case with digital recorders. This means that the requirements on precision which are demanded of the transformers constantly increase. This effects, on the one hand, the ferrite rings themselves, for example, the gap between the outer and inner ring and, on the other hand, the windings. The windings, which are made from a very thin wire, (for example of the order of magnitude of 0.15 mm in diameter) must be very precisely wound in a very confined region. Auxiliary means are sometimes utilized in order to assist in accommodating as precisely a defined winding as possible within a ferrite core.

An induction regulator for a recorder which utilizes a radially acting transformer is known in the art from DE 38 31 721 A1. A plastic body having grooves which is easily produced and which guarantees a high winding precision is utilized thereby to precisely guide the wire windings.

The use of such an auxiliary means is, however, relatively expensive and the handling of such a small plastic ring is difficult. In addition, particular problems are associated with the production of inner windings 42 needed for the stationary part 40 of the transformer.

A device for winding an inner transformer coil is described in the not previously published document DE 43 00 756 C2. An inner coil is produced in the inner groove of a ferrite ring using a winding spindle having a diagonal longitudinal bore for guiding the winding wire. The ferrite core or the winding spindle is rotated and displaced in the axial direction depending on the diameter of the winding wire. In this fashion, precise inner windings are produced. The winding spindle remains in the ferrite core after production of the inner winding so that the inner winding maintains its exact position during the securing of the inner winding in the ferrite core. The ferrite core is heated to bake a bonding layer which had been introduced onto the winding wire. The winding spindle is removed following a sufficient cooling period and is available for use in additional inner coil production.

The conventional device for winding an inner coil has the disadvantage that the winding spindle cannot be utilized during the time duration of the setting procedure of the inner coil in the ferrite core. In addition, heating can cause winding wire fed through the winding spindle to firmly bond inside the winding spindle or the bonding layer can change in such a fashion that subsequent attachment within the ferrite ring is compromised. An additional disadvantage is caused by the guiding of the winding wire through the diagonal longitudinal bore of the winding spindle, as a result of which the feeding of the winding wire from a supply roll is made more difficult, since the winding wire winds about the winding spindle in the event that same is rotated.

It is therefore the purpose of the present invention to present a method and a device with which the disadvantages of prior art are avoided.

SUMMARY OF THE INVENTION

This purpose is achieved through a method wherein a first and a second cylindrical body are each precisely introduced from a side into the ring-shaped body, wherein the winding wire is guided through the first cylindrical body in an approximately axial direction, the winding wire preferentially exiting in an approximately tangential fashion at the end of the first cylindrical body introduced into the ring-shaped body and is guided through the groove into the ring-shaped body and fixed outside thereof; the first and the second cylindrical bodies are moved towards each other until they are evenly adjacent to another; the location of the exit of the winding wire from the first cylindrical body is positioned in such a fashion that the winding wire seats on a side of the inner groove; the first cylindrical body or the ring-shaped body carries out a number of rotations corresponding to the number of desired windings, wherein first and second cylindrical bodies or the ring-shaped body are moved axially in the direction towards the other side edge of the groove in a manner depending on the speed resulting from the winding wire diameter and the rotational speed of the first cylindrical body; the first cylindrical body is removed from the ring-shaped body, wherein the winding wire is guided through the groove out of the ring-shaped body; the second cylindrical body is simultaneously introduced sufficiently far into the ring-shaped body that it completely covers the groove; and the second cylindrical body is removed from the ring-shaped body after the inner winding is securely connected to the ring-shaped body.

The purpose of the invention is also achieved with an apparatus wherein a winding spindle is provided having an approximately axial bore as well as an approximately tangential exit opening connecting with the bore through which the winding wire is guided; a second cylindrical body is provided for; the winding spindle and second cylindrical body have the same outer diameter which is slightly smaller than the inner diameter of the ring-shaped body; the winding spindle and the second cylindrical body are introduced into the ring-shaped body from opposite sides; the inner winding is produced by rotation and axial motion of the winding spindle and the second cylindrical body or, optionally, of the ring-shaped body; and the winding spindle is removed from the ring-shaped body after completion of the inner winding with the second cylindrical body remaining in ring-shaped body until the inner winding is secured in ring-shaped body.

The particular advantage of the method and device in accordance with the invention is that, following the production of an inner coil, an additional inner coil can be immediately produced without having to first wait for the final bonding of the previously produced inner coil. In addition, the guiding of the winding wire through the winding spindle in an approximately axial direction has the advantage that the winding wire can be easily fed from a supply roll even when the winding spindle is rotated.

Further advantages can be derived from the following detailed description of the invention with regard to the drawings:

BRIEF DESCRIPTION OF THE DRAWING

FIGS. 1A through 1C show the construction of the winding spindle in accordance with the invention as well as the construction of the coil body used, FIGS. 2A through 2F schematically show a procedure in accordance with the invention for the production of an inner winding, FIG. 3 shows the schematic construction of a device in accordance with the invention for the production of inner windings, and FIG. 4 shows a cut through the conventional induction regulator.

DESCRIPTION OF THE PREFERRED EMBODIMENT

Figure 2F:
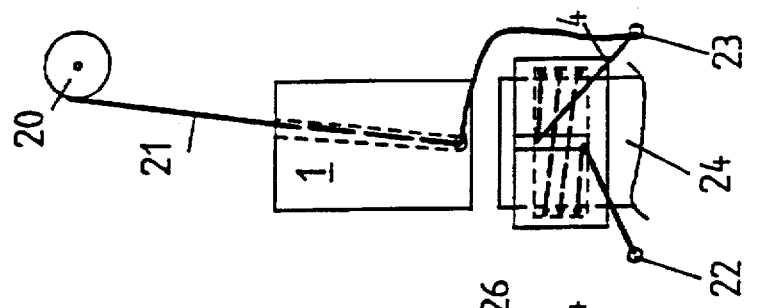

A cylindrical body 1, as shown in FIG. 1, is utilized as a winding spindle for the production of inner coils. The winding spindle has a largely axially running bore 2 for guiding a winding wire which feeds into an outlet opening 3 at the surface of the cylinder. As can be seen in the plan view of FIG. 1B, the outlet opening 3 is directed nearly tangentially with respect to cylindrical body 1 as a result of which the exit of the winding wire in the tangential direction with respect to winding spindle 1 is facilitated with reduced friction. In order to further improve the exit properties, it is possible for the outlet opening 3 to be produced from hard-metallic or ceramic material. FIG. 1C shows a ring-shaped body 4 having an inner groove 5 and a groove 6. The groove 6 is utilized as input and output for the winding wire forming the inner winding within the inner groove 5. The ring-shaped body 4 can, for example, be a ferrite ring.

The diameter of the winding spindle 1 is only slightly smaller (in the μm-range) than the inner diameter of the ferrite ring 4, so that the resulting inner diameter of the inner winding to be produced is practically identical with the inner diameter of the ferrite ring 4.

Figure 2E:
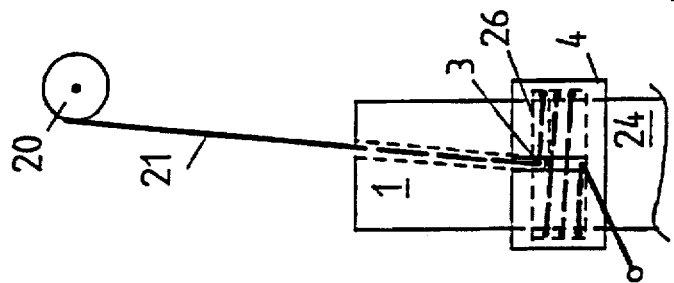
Figure 2D:
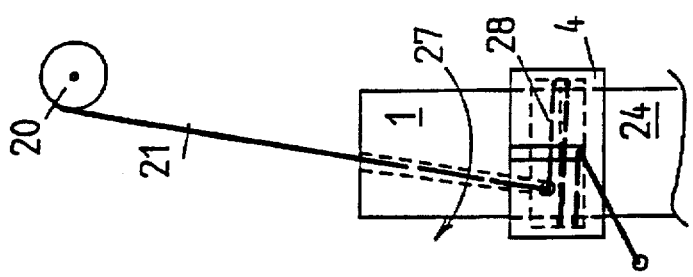
Figure 2C:
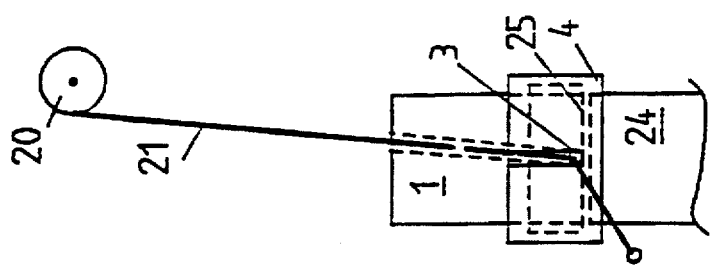
Figure 2B:
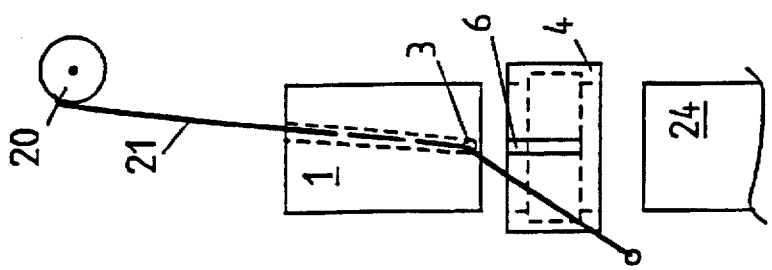
Figure 2A:
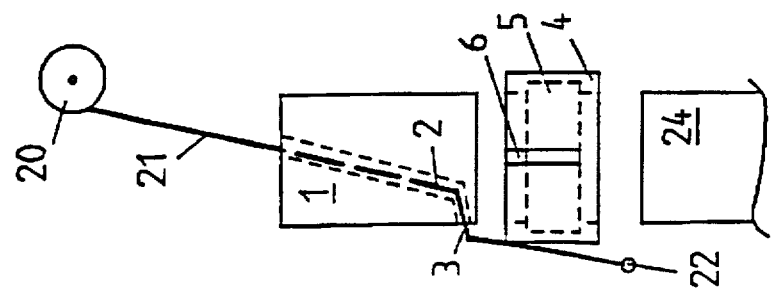

FIG. 2 shows a method for producing a single-layer inner winding.

The winding wire 21 coming from a supply roll 20 is fed through the winding spindle 1 and, is initially (FIG. 2A) secured outside of the ferrite ring 4 by means of a device 22.

The winding spindle 1 is subsequently (FIG. 2B) positioned above the ferrite core 4 in such a fashion that the outlet opening 3 is aligned with the groove 6.

In the following step (FIG. 2C), the winding spindle 1 is introduced into the ferrite core 4 in such a fashion that the outlet opening 3 is located at the side 25 of inner groove 5. The winding wire 1 then seats on side 25.

The cylindrical body 24 is simultaneously introduced into the ferrite ring 4 from the other side until it seats on winding spindle 1. The cylindrical body 24 can, for example, be formed from a bushing and has the same diameter as the winding spindle 1. Instead of introducing winding spindle 1 and bushing 24 into the ferrite core 4 as described above, it is possible, for example using a spring, to introduce the bushing 24 into the ferrite core 4 in such a fashion that it completely covers at least the inner groove 5. When introducing the winding spindle 1 as described above, the bushing 24 automatically is precisely positioned.

The winding spindle 1 is rotated in the direction indicated by arrow 27 (FIG. 2D, 2E) after positioning the winding spindle 1 and bushing 24. The configuration comprising winding spindle 1 and bushing 24 is displaced in the axial direction against the side 26 in a manner depending on the diameter of the winding wire 21 and the rotational speed of the winding spindle 1 so that an inner winding 28 with precisely adjacent windings results. The winding wire 21 needed for the inner winding 28 is continuously supplied from the supply coil 20. A moving and rotating of the ferrite core 4 is also possible in addition to the described motion in the axial direction of the winding spindle 1 and bushing 24 as well as the rotation of winding spindle 1.

When the desired winding number for inner winding 28 is reached, the winding spindle 1 is stopped in such a fashion that the outlet opening 3 of the winding spindle 1 is aligned with the groove 6. The winding spindle 1 is subsequently (FIG. 2F) removed from the ferrite ring 4 permitting the winding wire 21 to be grasped, passed through the groove 6 and attached a second time outside of the ferrite ring 4 by means of a device 23. Simultaneously with the removal of the winding spindle 1, the bushing 24 is introduced sufficiently far into the ferrite ring 4 that the inner groove 5 is completely covered. In this fashion, one guarantees that the inner winding 28 maintains its precise position.

Finally, the inner winding 28 can be baked in the ferrite ring 4 through heating and secured. The two ends of the winding wire 21 at the devices 22 and 23 can then be cut to the desired length and the bushing 24 can be removed from the ferrite core 4.

In addition to the described method of baking in an oven, it is also possible for the winding wire to be provided with a bonding layer and be heated and baked by means of an appropriate flow of current. It is also possible to secure the inner coil by using a glue or a solvent to etch the winding wire lacquer and effect bonding. The above described glue and solvent can be introduced into the ferrite ring 4 through appropriate bores in the bushing 24. With all of the described attachment methods it has been proven advantageous to provide the bushing 24 with a coating to prevent bonding of the inner winding. For example, a Teflon coating is suitable.

FIG. 3 shows a schematic construction of a configuration for the production of inner windings. Attachments 36 are introduced at equidistant separations to the surface of a rotary table 30 along the outer edge. The attachments 36 hold ferrite rings 4 and have bushings 24 shown in FIG. 2 in addition to suitable holding devices for holding the ferrite cores 4. The attachment devices 22 and 23, shown in FIG. 2, for attaching the winding wire are associated with each attachment 36.

The rotary table 30 rotates in steps of one attachment 36 in the direction shown by arrow 38 so that the attachments are each located in front of a device 31 through 37. The device 37 seats ferrite rings 4 into the attachment 36 of the rotary table 30, with attention being paid to the fact that the groove 6 faces the outside in the radial direction of the rotary table 30. The ferrite rings 4 are secured by a fixture which is not drawn in detail and the bushings 24 are introduced into the ferrite rings 4, for example, using spring-loading.

The above described production of the inner winding is done on winding device 31 which is located two rotational steps away. The attachment 21 and 23 can be clamps for securing the winding wire. Another possibility is to wind the winding wire about pins forming attachment devices 22 and 23 using the winding spindle. In this fashion the winding wire, after being secured at a first attachment device 22, is wound in the ferrite core, secured to a first attachment device 23, attached at a second attachment device 22 following partial rotation of the rotary table 22, etc.

After the next partial rotation, the winding wire insulation near attachments 22 and 23 is removed at insulation removal device 32. The insulation can, for example, be melted-off. This allows a current to be fed into the inner coil from setting device 33 following the subsequent partial rotation to set the inner coil within the ferrite ring by means of a bonding layer introduced onto the winding wire.

The cutting device 34 cuts the winding wire ends projecting out of the ferrite ring 4 to the desired length. Finally, removal device 35 removes the ferrite ring with the inner winding. The bushing 24 is removed from the ferrite core and the fixture 36 is disengaged.

The control and coordination of the individual devices 31 through 37 as well as the rotary table 30, in particular, the winding spindle 1 and the bushing 24 in winding device 31, can be done with a microcomputer or using conventional CNC-control.

In addition to the described configuration, a plurality of modified but equivalent configurations are possible as can be gleaned from the description by one of average skill in the art.

For example, a different configuration of the devices 31 through 37 about the rotary table or a consolidation of some of the devices 31 through 37 is possible. The insulation removal device 32 and setting device 33 (insulation removal and attachment) could be consolidated or the removal device 35 and seating device 37 (introduction and removal of the ferrite rings) could be replaced by manual operation.

A configuration of the fixtures 36 can also be chosen which differs from that of the rotary table. For example, the fixtures 36 as well as the attachment devices 22 and 23 can be arranged in an assembly line simulating fashion.

Finally, it is also possible to carry out a corresponding motion of the ferrite ring instead of axially moving and rotating the winding spindle and bushing.

We claim:

1. A method for the production of a single layer winding in an inner groove of a ring-shaped body, the ring-shaped body having a second groove for the input and output of a winding wire, the method comprising:

guiding the winding wire through a first cylindrical body in a substantially axial direction to an exit through a side of the first cylindrical body at an end thereof;

introducing the first cylindrical body into the ring-shaped body through a first opening in the ring-shaped body;

guiding the winding wire through the second groove into the ring-shaped body;

fixing an end of the winding wire outside the ring-shaped body;

introducing a second cylindrical body into the ring-shaped body through a second opening in the ring-shaped body;

moving the first and second cylindrical bodies so that the end of the first cylindrical body is adjacent to an end of the second cylindrical body within the ring-shaped body;

positioning the end of the first cylindrical body to seat the winding wire at a bottom of the inner groove;

winding the winding wire within the inner groove by rotating at least one of the first cylindrical body and the ring-shaped body while moving both the first and second cylindrical bodies in mutual adjacency towards a top of the inner groove;

completing the winding by moving the first and second cylindrical bodies to remove the first cylindrical body from the ring-shaped body and to completely cover the inner groove with the second cylindrical body;

guiding the winding wire through the second groove out of the ring-shaped body;

securing the winding wire within the inner groove; and removing the second cylindrical body from the ring-shaped body.

2. The method of claim 1, wherein a number of rotations of the first cylindrical body relative to the ring-shaped body corresponds to a number of windings and the first and second cylindrical bodies are moved in mutual adjacency in dependence on a diameter of the single layer winding and a rotation speed of the first cylindrical body relative to the ring-shaped body.

3. The method according of claim 1, wherein the winding is secured within the inner groove by heating the ring-shaped body.

4. The method of claim 1, wherein the winding is secured within the inner groove by passing current through the winding.

5. The method of claim 1, wherein the winding is secured within the inner groove with glue.

6. The method of claim 1, wherein the winding is secured within the inner groove with solvent.

7. An apparatus for producing a single layer winding in an inner groove of a ring-shaped body, the ring-shaped body having a second groove for the input and output of a winding wire, the apparatus comprising:

a winding spindle having a substantially axial bore and a substantially tangential exit opening connected to the axial bore, the axial bore and exit opening for guiding the winding wire therein;

a ring-shaped body having an axial through-opening and an inner groove adjacent at a groove top and a groove bottom to the axial through-opening, the axial through-opening having a diameter and the inner groove having a diameter larger than the axial opening diameter; and a cylindrical body having a diameter substantially equal to an outer diameter of the winding spindle and slightly smaller than the axial opening diameter, whereby the winding spindle and cylindrical body are introduced into the ring-shaped body from opposite sides of the ring-shaped body and the inner winding is produced by rotation and axial motion of the spindle and the cylindrical body relative to the ring-shaped body, the cylindrical body being removed from the axial opening after the inner winding is secured within the inner groove.

8. The apparatus of claim 1, wherein the winding wire forms mutually adjacent loops within the inner groove.

9. The apparatus of claim 1, wherein the winding spindle comprises one of ceramic and hard metallic material to improve the mechanical properties of the exit opening.

10. The apparatus of claim 1, further comprising bonding means selected from the group consisting of heat treated bonding material and shellac for securing the winding wire within the inner groove.

11. The apparatus of claim 1, further comprising a coating on the cylindrical body to prevent bonding of the winding to the cylindrical body.

12. The apparatus of claim 1, wherein the ring-shaped body comprises ferrite.

13. The apparatus of claim 7, further comprising a first device having attachment means for the ring-shaped body and for the winding wire, the device being adapted for stepwise movement; and second devices arranged in correspondence with the stepwise motion of the first device for producing a winding which is firmly secured to the ring-shaped body.

* * * * *

UNITED STATES PATENT AND TRADEMARK OFFICE
CERTIFICATE OF CORRECTION

PATENT NO. : 5,715,591
DATED : February 10, 1998
INVENTOR(S) : Friedrich ALBRECHT and Otto WEISS It is certified that error appears in the above-identified patent and that said Letters Patent is hereby corrected as shown below:

In column 4, lines 61 through 62, please replace "The device 37" with --The seating device 37--
In column 5, line 3, please replace "    attachment" with --attachment devices--
In column 6, line 59, claim 8, please replace "The apparatus of claim 1" with --The apparatus of claim 7--
In column 6, line 61, claim 9, please replace "The apparatus of claim 1" with --The apparatus of claim 7--
In column 6, line 64, claim 10, please replace "The apparatus of claim 1" with --The apparatus of claim 7--
In column 7, line 1, claim 11, please replace "The apparatus of claim 1" with --The apparatus of claim 7--
In column 7, line 4, claim 12, please replace "The apparatus of claim 1" with --The apparatus of claim 7--

Signed and Sealed this

Twenty-eighth Day of April, 1998

*Attest:*

BRUCE LEHMAN

*Attesting Officer*  Commissioner of Patents and Trademarks